US012774912B2

(12) United States Patent
Artiuch et al.

(10) Patent No.: US 12,774,912 B2
(45) Date of Patent: Oct. 27, 2026

(54) MEASURING FLUID TEMPERATURE IN A GAS METER

(71) Applicant: Natural Gas Solutions North America, LLC, Houston, TX (US)

(72) Inventors: Roman Leon Artiuch, Houston, TX (US); Lora Palacios Rothwell, Cypress, TX (US); Adam Paul Graebner, Hockley, TX (US)

(73) Assignee: Natural Gas Solutions North America LLC, Houston, TX (US)

( * ) Notice: Subject to any disclaimer, the term of this patent is extended or adjusted under 35 U.S.C. 154(b) by 279 days.

(21) Appl. No.: 18/496,972

(22) Filed: Oct. 30, 2023

(65) Prior Publication Data

US 2025/0137828 A1 May 1, 2025

Related U.S. Application Data

(60) Provisional application No. 63/421,266, filed on Nov. 1, 2022.

(51) Int. Cl.

*G01F 1/06* (2006.01)
*G01F 15/04* (2006.01)
*G01K 1/024* (2021.01)
*G01K 13/02* (2021.01)

(52) U.S. Cl.

CPC .............. *G01F 15/043* (2013.01); *G01F 1/06* (2013.01); *G01K 1/024* (2013.01); *G01K 13/02* (2013.01)

(58) Field of Classification Search

CPC ..... G01F 1/06; G01F 1/08; G01F 3/10; G01F 15/043; G01F 15/14; G01F 15/022; G01K 1/024; G01K 13/02; G01K 13/026

See application file for complete search history.

(56) References Cited

U.S. PATENT DOCUMENTS

| | | | | |
|---|---|---|---|---|
| 4,404,638 A * | 9/1983 | Yada | G01F 1/08 | 73/861.03 |
| 6,485,175 B1 * | 11/2002 | Nimberger | G01K 1/08 | 374/165 |
| 2015/0316401 A1 * | 11/2015 | Popp | G01F 1/684 | 73/204.11 |
| 2023/0130707 A1 * | 4/2023 | Collver | G01F 15/063 | 73/1.27 |

FOREIGN PATENT DOCUMENTS

DE 102018111167 A1 * 11/2019 ............. G01K 13/02

OTHER PUBLICATIONS

Computer translation of DE_10201811116_A1 (Year: 2025).*

* cited by examiner

*Primary Examiner* — Randy W Gibson
(74) *Attorney, Agent, or Firm* — Paul Frank + Collins P.C.

(57) ABSTRACT

A temperature probe is configured for use in gas meters. These configurations may include a thermo-well that extends through the body of the gas meter. The thermo-well may have an end proximate a center axis of the body, which corresponds with a center or middle of flow that transit the device. A temperature sensor may reside in the thermo-well at this end. In one implementation, thermo-conductive material may secure the sensor in position in the thermos-well. This material may enhance thermal conduction between the temperature sensor and the thermos-well. The other parts of the temperature probe may remain thermally-isolated to avoid corruption of the temperature readings.

20 Claims, 11 Drawing Sheets

MEASURING FLUID TEMPERATURE IN A GAS METER

CROSS-REFERENCE TO RELATED APPLICATIONS

This application claims the benefit of priority to U.S. Ser. No. 63/421,266, filed on Nov. 1, 2022, and entitled "MEASURING FLUID TEMPERATURE IN A GAS METER." The content of this application is incorporated herein by reference in its entirety herein.

BACKGROUND

Metrology hardware finds use in systems that require accurate, reliable metering of fluid resources, like water or fuel gas. Gas meters and flow meters are types of metrology hardware that precisely measure a volume of this fluid. These measurements form a basis for billing customers for consumption of the resource. Nominally, use as a billing "machine" requires gas meters (and flow meters) to meet certifications or standards that regulatory bodies promulgate under authority or legal framework of a given country or territory. Some standards are in place to protect public interests, for example, to provide consumer protections for metering and billing consumption of fuel gas. These protections may define units of measure or set thresholds for realization of these units of measure in practice in order to ensure the device generates measurements with appropriate accuracy and reliability. Data that reflects temperature and pressure of the resource is fundamental to meet these accuracy requirements. However, design of flow meters often frustrate measurements at locations that would provide the most accurate measure of these parameters.

SUMMARY

The subject matter herein relates to improvements to gas meters or metrology hardware to provide more accurate temperature measurements. Of particular interest are embodiments that locate temperature sensors in the middle of flow through the device. These embodiments may employ structure to minimize effects of temperature gradient that can prevail in the field, often between temperature in proximity to the meter (or "ambient temperature") and temperature of gas or fluid that flows through the meter. This feature can avoid certain distortion that the temperature gradient may cause to the volume measurements the gas meter provides for billing purposes because it minimizes effects of ambient temperature on the temperature readings.

DRAWINGS

Reference is now made briefly to the accompanying drawings, in which.

Figure 1:
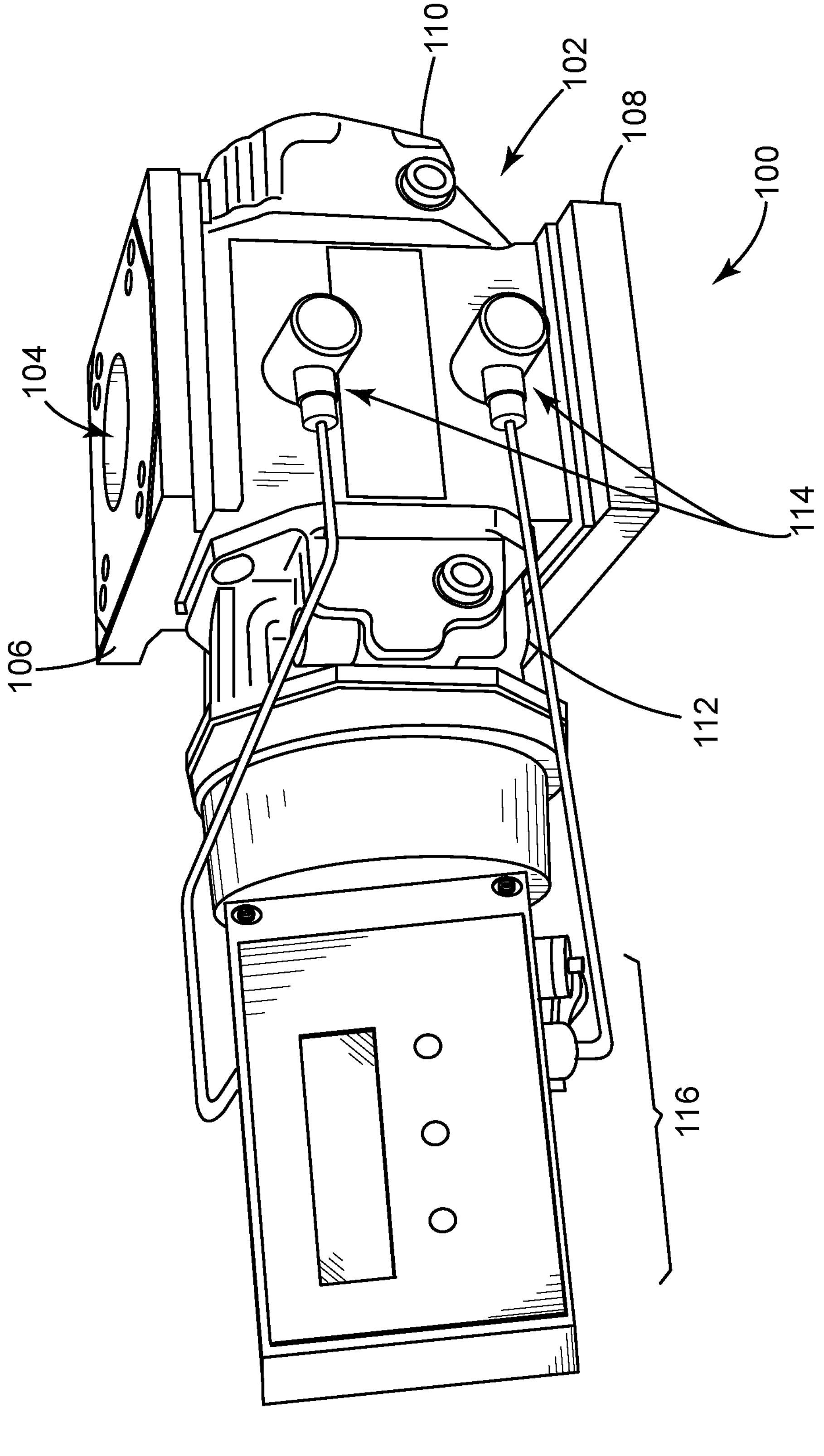
FIG. 1 depicts a perspective view of an exemplary embodiment of a gas meter.
Figure 2:
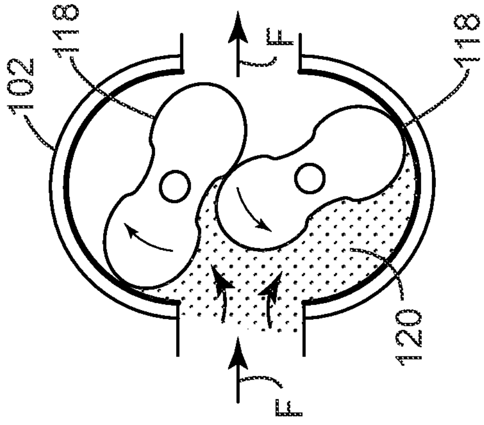
FIG. 2 depicts a schematic diagram of the gas meter of FIG. 1.
Figure 3:
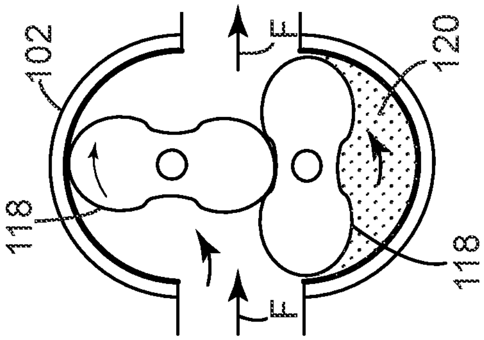
FIG. 3 depicts a schematic diagram of the gas meter of FIG. 1.
Figure 4:
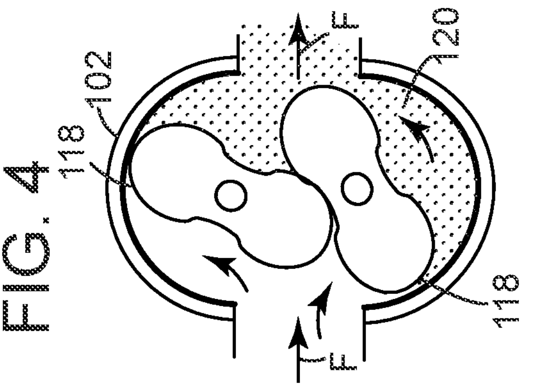
FIG. 4 depicts a schematic diagram of the gas meter of FIG. 1.
Figure 5:
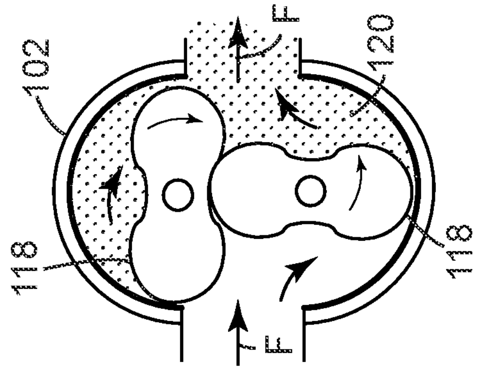
FIG. 5 depicts a schematic diagram of the gas meter of FIG. 1.

These drawings and any description herein represent examples that may disclose or explain the invention. The examples include the best mode and enable any person skilled in the art to practice the invention, including making and using any devices or systems and performing any incorporated methods. The drawings are not to scale unless the discussion indicates otherwise. Elements in the examples may appear in one or more of the several views or in combinations of the several views. The drawings may use like reference characters to designate identical or corresponding elements. Methods are exemplary only and may be modified by, for example, reordering, adding, removing, and/or altering individual steps or stages. The specification may identify such stages, as well as any parts, components, elements, or functions, in the singular with the word "a" or "an;" however, this should not exclude plural of any such designation, unless the specification explicitly recites or explains such exclusion. Likewise, any references to "one embodiment" or "one implementation" should does not exclude the existence of additional embodiments or implementations that also incorporate the recited features.

DESCRIPTION

The discussion now turns to describe features of the embodiments shown in the drawings noted above. These embodiments address concerns with temperature gradient that gas meters may encounter in the field. The gradient occurs because gas predominantly flows underground upstream of gas meters, which typically reside above ground, for example, next to a building or residence. This arrangement maintains gas at constant temperature (of around 5° C.) just prior to ingress into the device. However, gas meters are often subject to much higher temperatures because their location above-ground exposes them to natural elements and weather patterns. Sun and warm weather, for example, may heat structure of gas meters to well above the temperature of the incoming gas. It is not uncommon to have temperature gradients of 60° C. or more for gas meters in the field in warmer climates or during warm seasons. Other embodiments may be within the scope and spirit of the subject matter disclosed herein.

FIG. 1 depicts a perspective view of an example of a flow meter in the form of a gas meter 100. This example may have a meter body 102, typically a cast or machined metal housing with a "pass-through" flow path 104 that terminates at flanged ends (e.g., a first flanged end 106 and a second flanged end 108). Covers 110, 112 may attach to opposite sides of the metal housing 102. The covers 110 allow access to an interior cavity where mechanics reside in the flow path 104. The gas meter 100 may also include a differential pressure (DP) unit 114 to monitor differential pressure across these mechanics. The DP unit 114 may direct fluid from the flow path 104 to an electronics unit 116 that is useful to generate, collect, and process data. Circuitry in the electronics unit 116 may include a DP sensor (not shown) that can measure differential pressure from the inputs from the DP unit 114. This DP sensor can activate and de-activate as necessary to gather DP data.

FIGS. 2, 3, 4, and 5 depict schematic diagrams of the cross-section of an example of the gas meter 100 of FIG. 1. Positive-displacement rotary type devices may include a pair of lobed-impellers 118 that precisely mesh with one another. The impellers 118 counter-rotate in response to flow of fluid F in flow path 104. The diagrams show configurations of the impellers 118 that occur during one complete "revolution." Each configuration creates a "virtual chamber" 120 that corresponds with a precise amount or volume of fluid F that exhausts from flow path 104 to conduit downstream of the device.

Customer billing requires accurate measurements of temperature and pressure of fluid F in the virtual chamber 120. This data finds use to account for or "correct" for small or localized changes in the parameters of fluid F as it pass through the device. Pressure measurements typical of line pressure, or pressure upstream of the gas meter 100, are useful to estimate pressure in the virtual chamber 120 because this parameter tends to remain constant in the interior cavity of the meter body 102. Temperature readings on the other hand must occur upstream of the impellers 118 because rotation of these parts prohibits use of devices inside of the virtual chamber 120.

Figure 6:
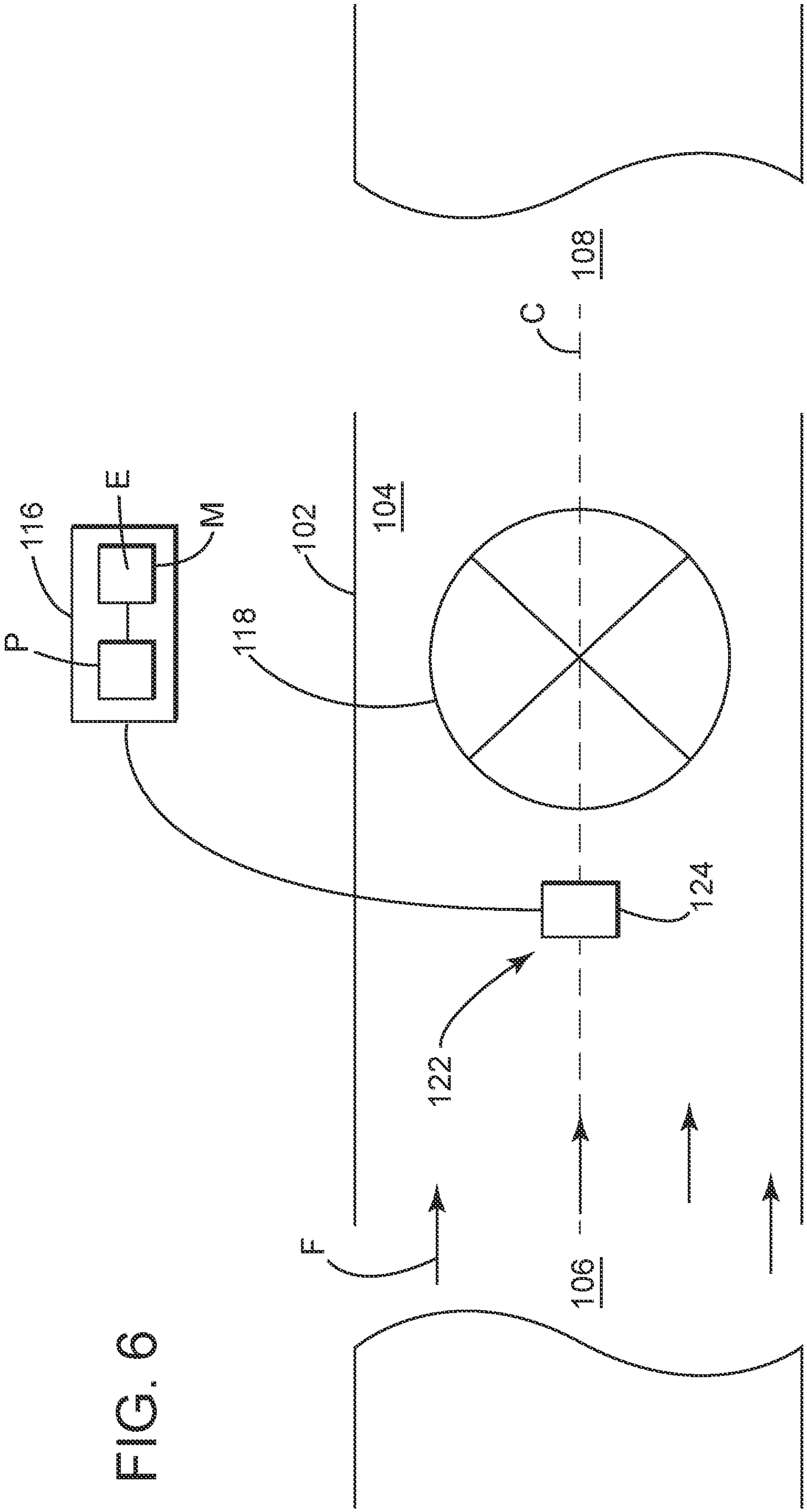
FIG. 6 depicts a schematic diagram of the gas meter of FIG. 1.

FIG. 6 depicts a schematic diagram of an example of the gas meter 100. Temperature data may originate from a temperature probe 122 that locates a sensor 124 at or in proximity to longitudinal axis C of the flow path 104. This location may correspond with a central location in flow F as it transits the device across impellers 118 between flanged openings 106, 108. The sensor 124 may embody devices that are sensitive to changes in temperature. The electronics unit 116 may include hardware to process the temperature data from these devices. This hardware may include a processor P and memory M. Executable instructions E may be stored on the memory M, for example, in the form of software, firmware, or like computer programs. The executable instructions E may configure the processor P to process data including, for example, temperature data from the sensor 124, pressure from DP unit 114, (or any upstream or downstream sensors, for example, sensors that measure line pressure). These processes may generate a value for volumetric flow of fluid F that corresponds with rotation of the impellers 118 (to create the virtual chamber 120).

Figure 7:
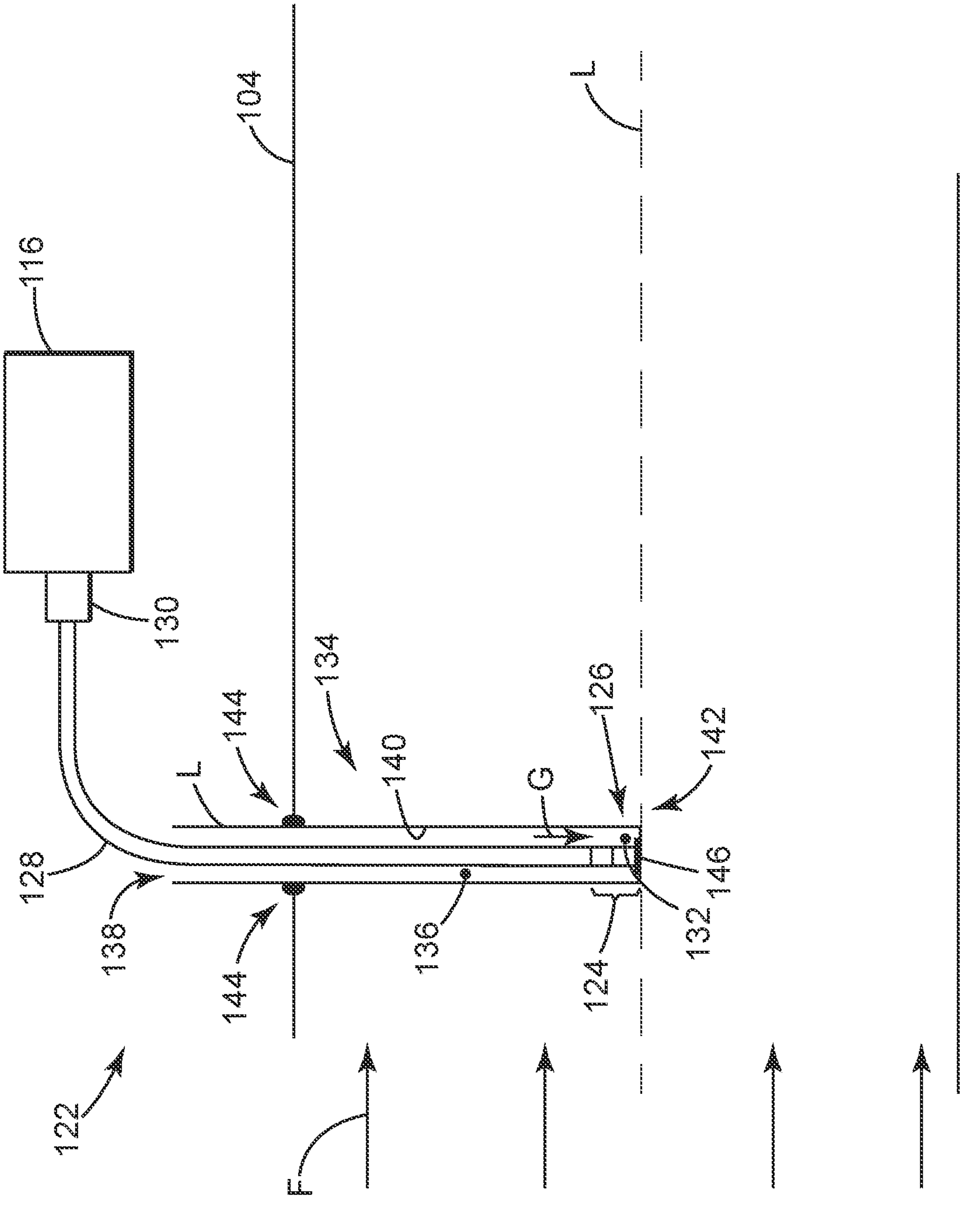
FIG. 7 depicts a schematic diagram of an exemplary embodiment of a temperature sensor for use in the gas meter of FIG. 1.

FIG. 7 depicts a schematic diagram of exemplary structure for the sensor 124. This structure may include a circuitized substrate 126, like a printed circuit board (PCB). Leads 128 may extend from one end of the substrate 126. The leads 128 may terminate at a connector 130 that serves to interface with, for example, a complimentary connector found on the electronics unit 116. A temperature-sensitive component 132 may embody a device that is disposed on the other end of the substrate 126. These devices may include thermocouples, thermistors, resistors, solid-state devices, or like temperature-sensitive implements.

The substrate 126 may be configured to provide proper electrical or signal connections. In addition to PCB, the substrate 126 may embody a silicon-based circuit or solid state device. These devices may prove useful to integrate other functionality into the sensor 124, for example, as a chipset, system-on-chip, microprocessor, or other processing arrangement. Leads 128 may embody a wiring harness with various wires that direct signals, like power or communication, between the substrate 126 and the electronics unit 116. A power source may be useful, as appropriate. The connector 130 may include a quick-connect device, although soldered ends may be appropriate as well.

Additional structure for the temperature probe 122 may prove useful to protect sensitive components. This structure may include a housing 134, shown here as a tube 136 or elongate, hollow cylinder that extends into the interior cavity of the meter body 102. This "thermo-well" may have a bore 138 with an interior surface 140 of dimensions (e.g., diameter) to receive the substrate 126. The bore 138 may terminate at an end 142 proximate the axis C. As shown, a part of the thermo-well 136 may reside outside of the meter body 104 as well. This part may allow access to the sensor 124, for example, to remove and replace the substrate 126 or to provide leads 128 with egress to the electronics unit 116. In one implementation, construction of the gas meter 102 may thermally isolate the thermo-well 128 from the meter body 104. Insulation 144 may reside at contact points, for example, to frustrate conduction of heat. The thermo-well 136 may also adopt structure to frustrate heat transfer from, for example, areas in proximity to the meter body 102 to the end 142 of the thermo-well 136. This structure may incorporate thermally-resistant elements or may adopt a material composition that frustrates thermal conduction from one part of the thermo-well 138 to another. This material composition may incorporate different materials that exhibit different rates of thermal conductivity, for example, where materials that insulate are disposed at or near the interface with the meter body 104 and materials that conduct thermal energy or heat are disposed at or near the end 142 of the thermo-well 136. This feature may reduce heat transfer from the meter body 104, but still maximize heat transfer from the fluid F to the temperature-sensitive component 132.

Dimensions for the bore 138 may allow for an air gap G between the interior surface 140 and at least the substrate 126. The air gap G may form space that circumscribes all or part of the substrate 126, as desired. Insulation may fill this space to further isolate the sensor 124 or, at least, the temperature-sensitive component 132. In one implementation, the component 132 may reside at the end 142 of the thermo-well 136. This position may locate the temperature-sensitive component 132 at the "middle" of flow F. Thermo-conductive material 146 may find use to adhere the substrate 126 to the thermo-well 136 in this position. The material 146 may comprise materials with high thermal conductivity, like thermo-paste or potting material; although adhesives or epoxy may prove useful as well. This feature may also enhance heat transfer from the thermo-well 136 to the temperature-sensitive component 132. In one implementation, a load L may bias the sensor 124 into the thermo-well 136. This feature may utilize devices like springs (or spring-like, resilient materials) to ensure that the sensor 124 remains in proximity to the end 142 of the bore 140.

Figure 8:
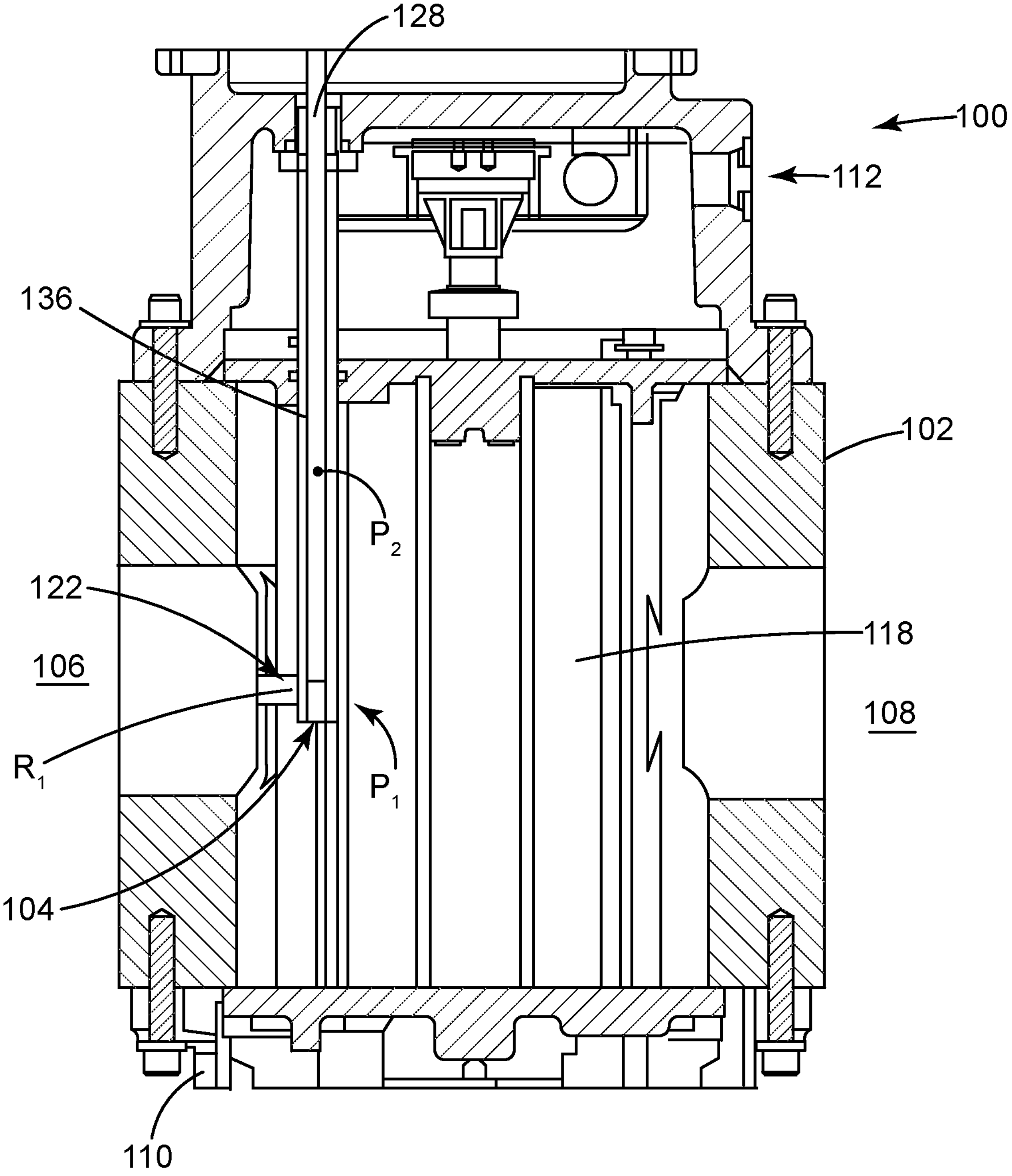
FIG. 8 depicts an example of the temperature sensor of FIG. 7.
Figure 9:
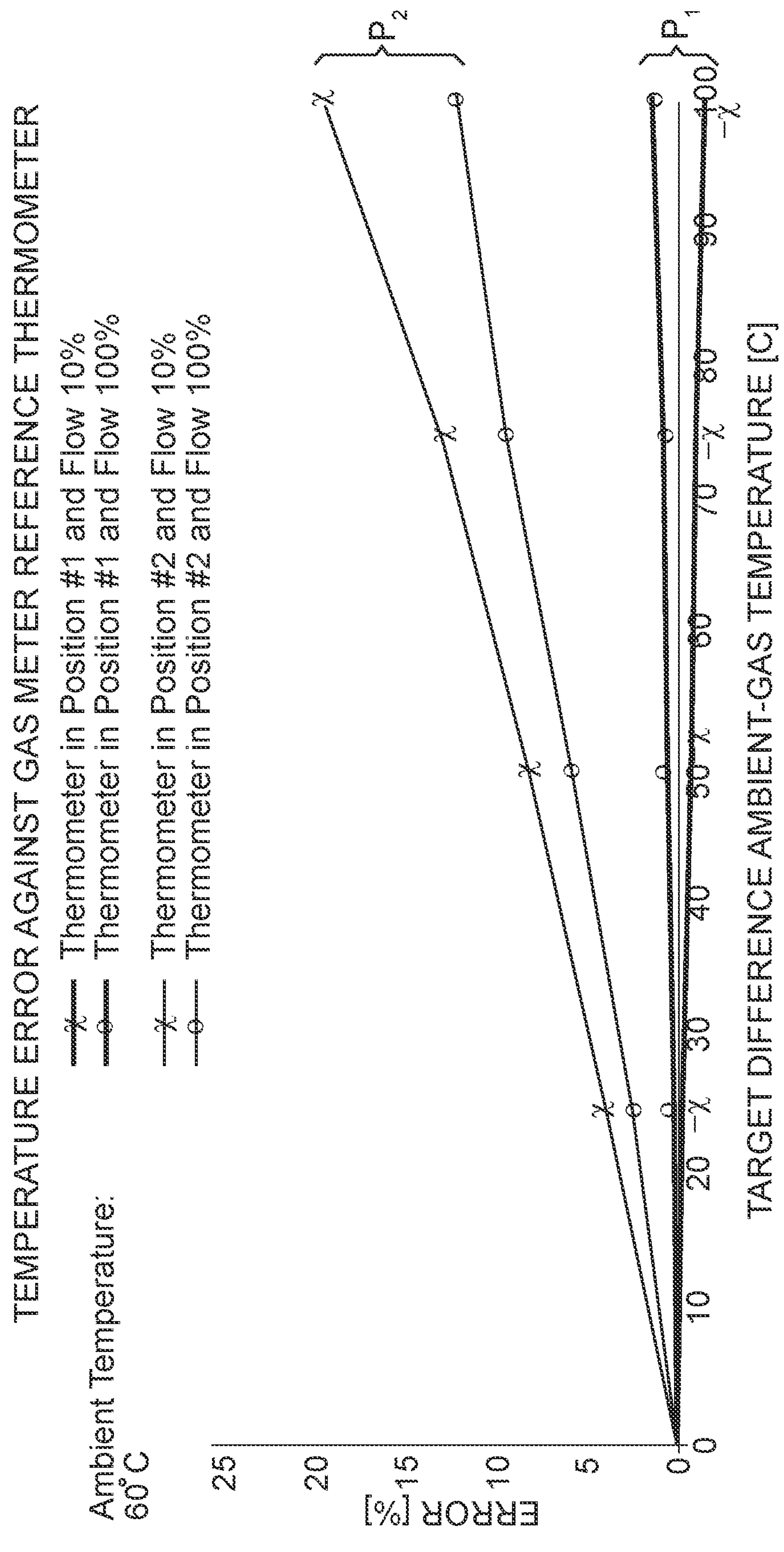
FIG. 9 depicts a plot of temperature data gathered from the gas meter of FIG. 8.
Figure 10:
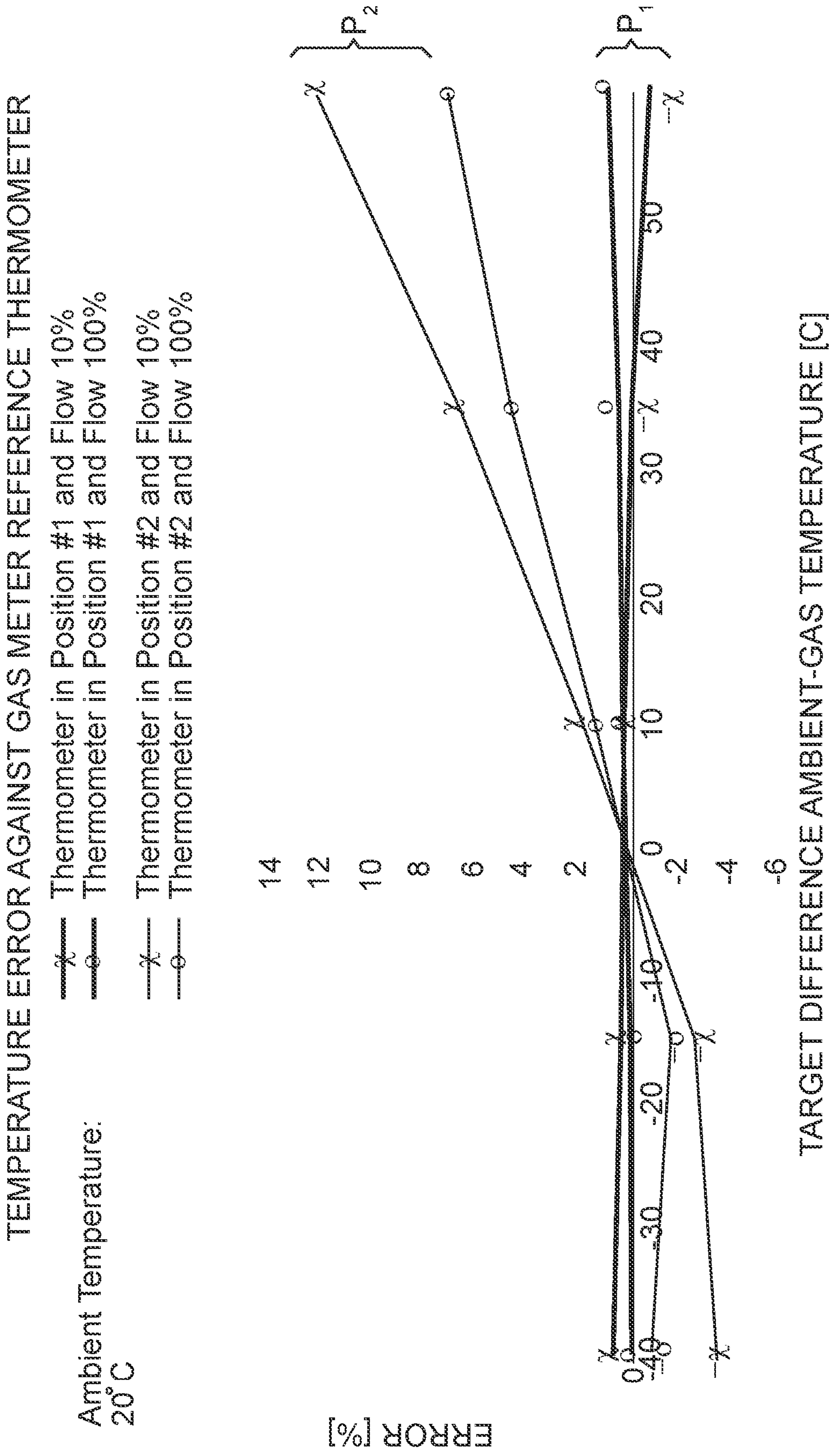
FIG. 10 depicts a plot of temperature data gathered from the gas meter of FIG. 8.
Figure 11:
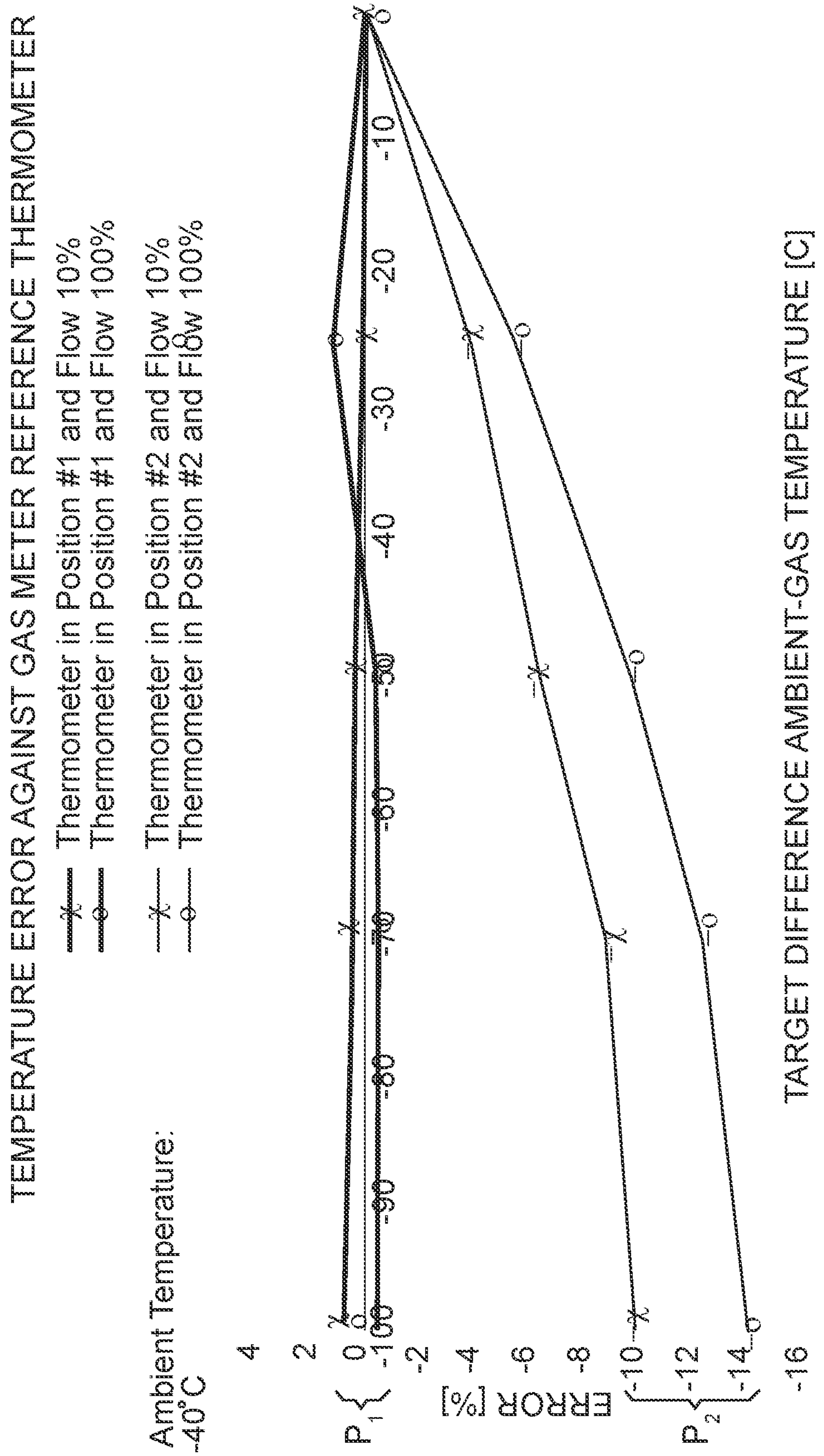
FIG. 11 depicts a plot of temperature data gathered from the gas meter of FIG. 8.

FIG. 8 depicts an elevation view of the cross-section of an example of the gas meter 100. This example embodies a rotary positive displacement gas meter or "rotary meter." This device may be configured for residential, commercial, or industrial use (e.g., for custody transfer measurement in a pipeline). The rotary meter may be configured for in-line installation on the pipeline (not specifically represented), wherein the gas meter 100 is integrated directly as a section of the pipeline. These configurations may include one or more bearing packages, a bearing lubrication reservoir and slinger assembly, and the timing gear needed to keep the impellers 118, in correct relative position. In one implementation, the device may include a counter housing that encases hardware and electronics (of the counter member) to count the impeller rotations and calculate the concomitant volumetric flow.

Figure 12:
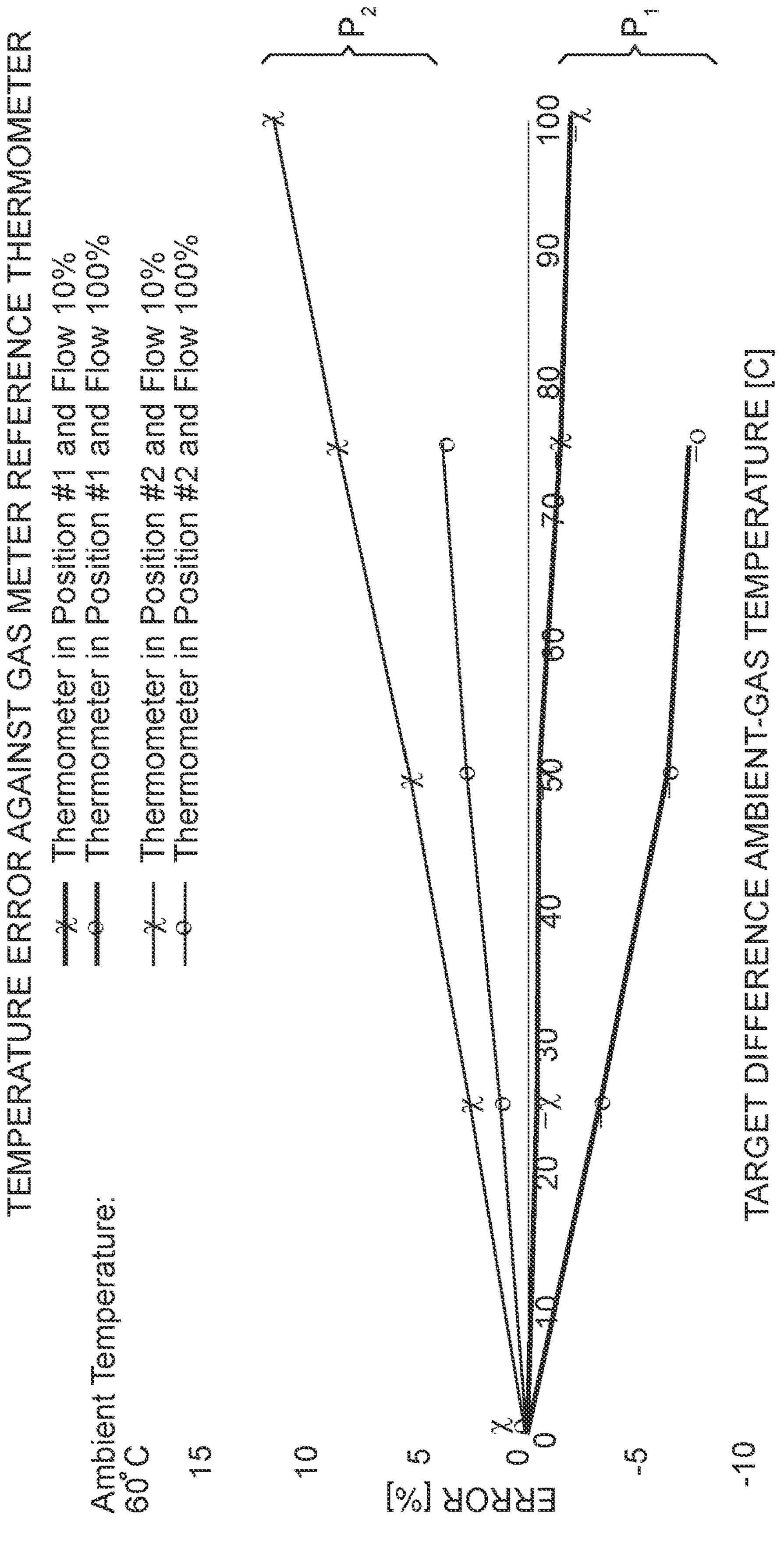
FIG. 12 depicts a plot of temperature data gathered from the gas meter of FIG. 8.
Figure 13:
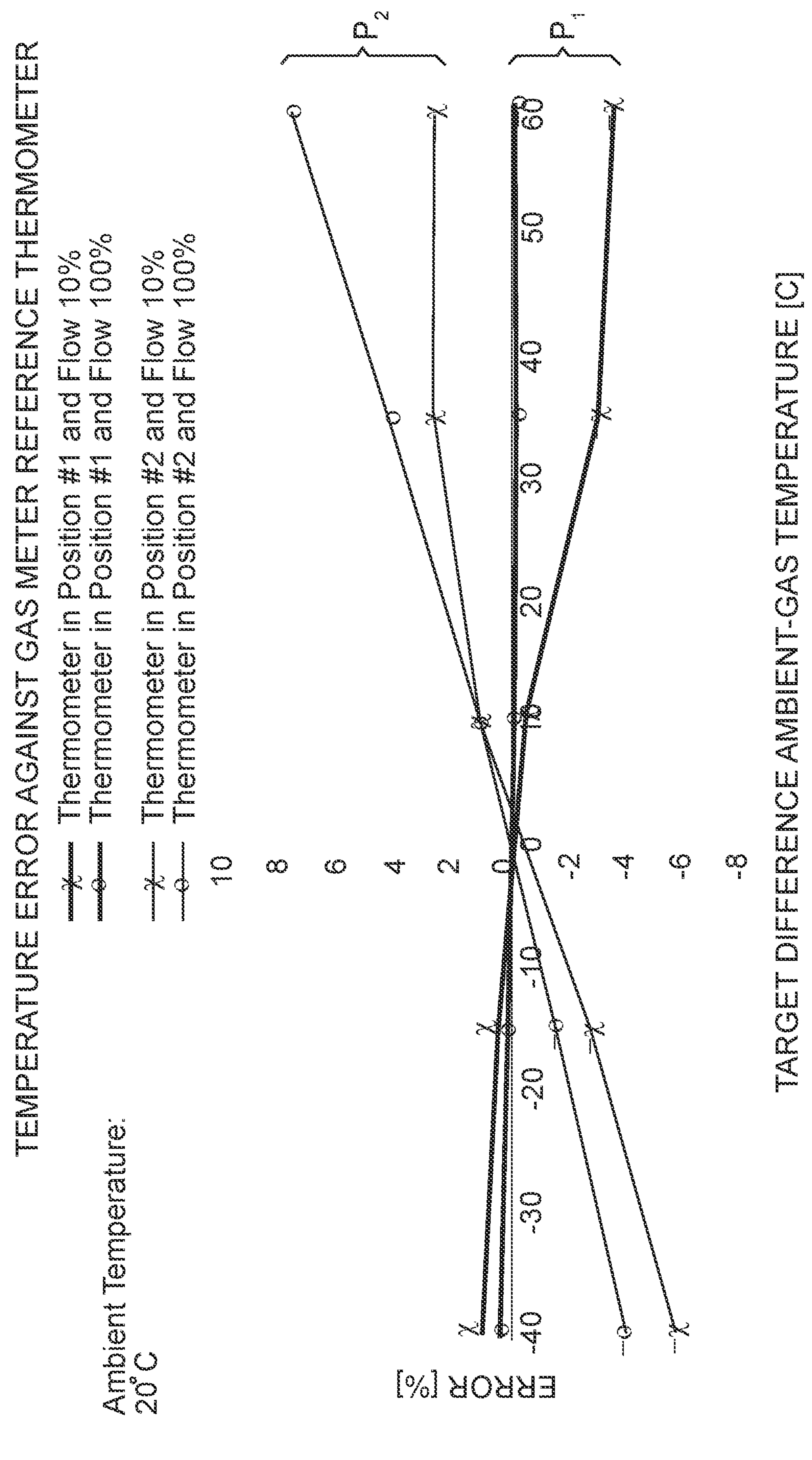
FIG. 13 depicts a plot of temperature data gathered from the gas meter of FIG. 8.
Figure 14:
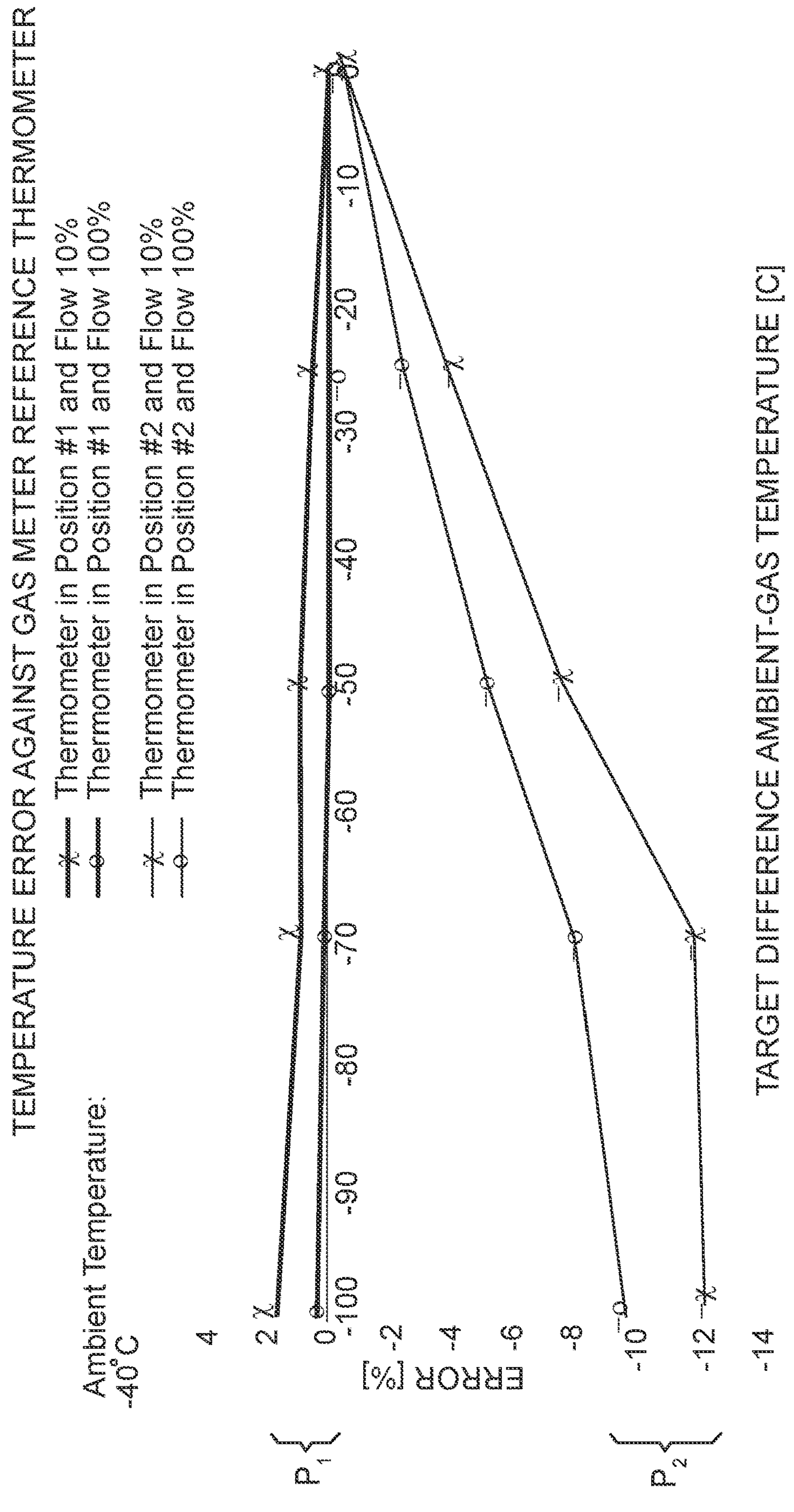
FIG. 14 depicts a plot of temperature data gathered from the gas meter of FIG. 8.

FIGS. 9, 10, 11, 12, 13, and 14 depict plots of data for tests done on examples of the gas meter 100 of FIG. 8. The examples included two devices, a first device with a maximum flow rate of 3000 CFH (FIGS. 9, 10, 11) and a second device with a maximum flow rate of 800 CFH (FIGS. 12, 13, 14). The tests introduce air flow through these devices at ambient temperatures of 60 C, 20 C, or −40 C to collect temperature readings from the sensor 118. Gas flow was at rates of 10% or 100% of maximum rates for the gas meter. The temperature of the gas was set at 60 C, 35 C, 10 C, −15 C, and −40 C. The data corresponds with temperature readings taken at a first position P1 (with the sensor 118 at the end 134 of the bore 132) or at a second position P2 (with the sensor 118 spaced apart from first position and the center axis C). Both positions P1, P2 are enumerated on FIG. 3. The plots identify a error (%) between temperature measurements made at the positions P1, P2 and a reference sensor R1 that resides upstream of the thermo-well 128. As shown, the error for first position P1 is much lower than the error for the second position P2. This feature indicates that the design that secures the sensor 124 at the bottom of the thermo-well 136 provides more accurate reading of temperatures.

The examples below include certain elements or clauses to describe embodiments contemplated within the scope of this specification. These elements may be combined with other elements and clauses to also describe embodiments. This specification may include and contemplate other examples that occur to those skilled in the art. These other examples fall within the scope of the claims, for example, if they have structural elements that do not differ from the literal language of the claims, or if they include equivalent structural elements with insubstantial differences from the literal language of the claims.

What is claimed is:

1. A gas meter, comprising:
a meter body forming an interior cavity with a longitudinal axis;
a temperature sensor disposed in the interior cavity to measure temperature of fluid proximate the longitudinal axis.

2. The gas meter of claim 1, further comprising:
a tube,
wherein the temperature sensor is disposed at one end of the tube.

3. The gas meter of claim 1, further comprising:
a tube extending through the meter body so as to locate an end proximate the longitudinal axis,
wherein the temperature sensor is disposed at the end of the tube proximate the longitudinal axis.

4. The gas meter of claim 1, further comprising:
a tube extending through the meter body so as to have a first part outside of the meter body and a second part inside the meter body, the second part having an end proximate the longitudinal axis,
wherein the temperature sensor is disposed at the end of the tube proximate the longitudinal axis.

5. The gas meter of claim 1, further comprising:
a tube extending through the meter body, the tube having a bore with an open end and a closed end, the closed end being proximate the longitudinal axis,
wherein the temperature sensor is disposed at the closed end of the tube.

6. The gas meter of claim 1, further comprising:
a tube extending through the meter body, the tube having a bore with an open end and a closed end, the closed end being proximate the longitudinal axis;
a cable connected to the temperature sensor and extending out the open end of the bore,
wherein the bore has dimensions that creates an air gap between the temperature sensor and the bore.

7. The gas meter of claim 1, further comprising:
a tube extending through the meter body, the tube having a bore with an open end and a closed end, the closed end being proximate the longitudinal axis,
thermo-conductive material disposed in the bore and in contact with the temperature sensor.

8. The gas meter of claim 1, further comprising:
a tube extending through the meter body, the tube having a bore with an open end and a closed end, the closed end being proximate the longitudinal axis,
thermo-conductive material disposed at the closed end,
wherein the temperature sensor is disposed in the thermo-conductive material.

9. The gas meter of claim 1, further comprising:
a tube extending through the meter body, the tube having a bore with an open end and a closed end, the closed end being proximate the longitudinal axis,
thermo-conductive material disposed at the closed end; and
a cable connected to the temperature sensor and extending out the open end of the bore,
wherein the temperature sensor is disposed in the thermo-conductive material.

10. The gas meter of claim 1, further comprising:
impellers disposed in the interior cavity,
wherein the temperature sensor resides on an upstream side of the impellers.

11. The gas meter of claim 1, wherein the tube comprises at least two materials that exhibit different rates of thermal conductivity.

12. A gas meter, comprising:
a meter body forming an interior cavity with a longitudinal axis;
impellers disposed in the interior cavity;
a tube extending through the meter body and having an end proximate the longitudinal axis; and
a temperature sensor disposed inside of the tube and proximate the end.

13. The gas meter of claim 12, further comprising:
insulation disposed between the meter body and the tube.

14. The gas meter of claim 12, further comprising:
thermo-conductive potting material disposed between the temperature sensor and the tube.

15. The gas meter of claim 12, further comprising:
securing the temperature sensor to measure temperature of fluid proximate the longitudinal axis.

16. The gas meter of claim 12, wherein an air gap separates the temperature sensor from the tube.

17. The gas meter of claim 12, wherein an air gap separates the temperature sensor from sides of the tube.

18. The gas meter of claim 12, wherein the tube has an opening outside of the meter body.

19. The gas meter of claim 12, wherein the sensor comprises a circuit board, a temperature sensitive element resident proximate the end of the tube, and leads that connect the circuit board to an electronics unit attached to the meter body.

20. The gas meter of claim 12, wherein the tube resides upstream of the impellers.

* * * * *